United States Patent Office 2,725,336
Patented Nov. 29, 1955

2,725,336

PREPARATION CONTAINING MODIFIED PROCAINE PENICILLIN CRYSTALS AND PROCESS FOR PREPARING SUCH CRYSTALS

Oscar R. Sumner, Bayside, and Thomas C. Grenfell, Valley Stream, N. Y., assignors to Chas. Pfizer & Co., Inc., New York, N. Y., a corporation of New Jersey No Drawing. Application November 6, 1950, Serial No. 194,378

7 Claims. (Cl. 167—65)

This invention relates to processes for modifying crystalline procaine penicillin salts, and to the new compositions produced by such processes, which are of enhanced therapeutic effectiveness.

It is well known that sodium penicillin and other water-soluble salts of penicillin have surprisingly beneficial antibiotic properties. When solutions made of these materials are administered parenterally, they are assimilated promptly into the body fluids, and thereafter are rapidly eliminated. Accordingly, they are effective for only a relatively short time. For optimum therapeutic results, the concentration of penicillin in the body fluids must be maintained at a substantial level for an appreciable period of time; hence, frequent injections are necessary. This is undesirable from the viewpoint of both the patient and the physician. In addition, much larger amounts of penicillin are required than are immediately necessary.

More recently the discovery of procaine penicillin has played a significant role in the advance of penicillin therapy. This material has a prolonged antibiotic effectiveness, with the consequent minimization of the periods of administration required. In addition, it produces a more uniform penicillin blood level throughout the period between injections, inasmuch as the penicillin is released gradually into the body fluids. However, the commercial manufacture of this new compound has a serious disadvantage: it is extremely difficult or impossible to obtain crystals of the product which are uniform in size and shape and thus readily useful in medicine. Further, the relatively insoluble procaine penicillin is still assimilated by the body fluids at a more rapid rate than is desirable for optimum therapy.

It is an object of this invention to provide means for preparing procaine penicillin salts of uniform crystalline characteristics. A further object is to produce new penicillin preparations which are therapeutically efficient and meet the requirements hereinbefore set forth. This application is a continuation-in-part of our co-pending applications, Serial Numbers 62,977 and 62,978, both filed on December 1, 1948 and both now abandoned.

We have discovered that the foregoing and other objects may be achieved by precipitating procaine penicillin salts from aqueous solution in the presence of a vegetable gum. Vegetable gums appear to modify and regulate the crystallization process, so that procaine penicillin crystals of uniform size and shape result. Too, the gums reduce the rate at which the penicillin salt is assimilated by the body fluids, so that even greater therapeutic efficiency is possible than procaine penicillins have heretofore offered. At the same time the modifying agents are inert towards the penicillin and have no deleterious action on the body tissues or functions. Precipitating the procaine penicillin in the presence of such a gum provides a crystalline form of the antibiotic which can be readily incorporated in an injectable menstruum, and the dose then injected is assimilated so gradually by the body fluids that an effective antibiotic concentration is maintained for unusually long periods of time, customarily from about two to about four days. Some of the new products are also advantageous in that they may be suspended in either water or vegetable oils. When water is added to them, gelled compositions are produced.

Vegetable gums which we have found to be suitable as crystallization regulators include Indian gum, agar, gum tragacanth, Irish moss, pectin, gum karaya, gum arabic (acacia) and other similar synthetic or derived natural materials, such as Tweens, Spans, carboxymethyl cellulose, and methylcellulose. These gums, of course, should be treated before use to remove such deleterious impurities as may be present. Customary purification treatments may be employed for this purpose. The gums may be used alone or in admixture with one another, if desired, since they appear to be compatible in practically all proportions. Because of their availability and particular efficiency, pectin and gum tragacanth are generally preferred treating agents. The penicillin salt with which the gums are utilized is preferably procaine penicillin G, a white crystalline material ideally suited for this treatment. It is also contemplated that solid particles of procaine penicilline dihydro-F, as well as other procaine penicillin salts and derivatives, may be prepared in accordance with this invention.

In the practice of our new process, a procaine penicillin is modified with a vegetable gum by crystallizing the antibiotic compound from an aqueous solution in the presence of the gum. This is generally achieved by dissolving the gum modifier in an aqueous solution of a soluble penicillin salt and then adding procaine hydrochloride or other suitable water-soluble procaine salt to precipitate the procaine penicillin product. Alternatively, the gum may be dissolved in procaine salt solution and the soluble penicillin salt may be added thereto. However, we prefer the first method for commercial use.

As previously mentioned, the presence of the vegetable gum serves to control the crystalline form of the procaine penicillin as it precipitates. Thus, the presence in an aqueous solution of sodium or potassium penicillin of a small amount of pectin or other suitable gum will result, when procaine hydrochloride is added thereto, in the formation of crystals of procaine penicillin which are very uniform in size, dense, compact and resistant to fragmentation, and which possess a relatively slow, uniform rate of dissolution in vivo. In contrast to this, crystals formed without regulation by a vegetable gum consist of plate-like particles which are irregular in size and shape and easily broken during mechanical handling and which have a relatively rapid rate of dissolution. Such a prior art product contains a considerable proportion of very fine fragments which do not have the appearance of complete crystals but rather seem to have been broken from crystals during the formation of the salt. The reason for the effect of gums in the crystallization process is not known. We are not quite certain how the molecules or miscelles of the gum are attached to the procaine penicillin molecules. Whether they are present in interstices or whether they are actually adsorbed on the crystal faces as a coating, is not clear.

In crystallizing procaine penicillin in the presence of vegetable gums, the rate of formation of the crystals, their size and shape, and the amount of gum deposited therewith may be controlled by changing the concentration of the modifying agent in the solution at the time of formation of the crystals. Each of these gums varies somewhat in the degree of control it exerts on the crystal formation. However, a minimum of inter-adjustment by one skilled in this art establishes a favorable proportion of a given gum to be used in obtaining crystals of the desired size and density. The product crystals, being compact and dense and of uniform size and shape, assist in obtaining uniform and favorable blood levels when preparations thereof are injected. In addition, crystals of the type we produce, when suspended in an injectable menstruum, are very easily syringed, causing no blocking of needles commonly used. Furthermore, the gum remaining associated with the crystals assists in delaying dissolution of the compound and thus enhances the prolongation of therapeutic blood levels. The mode and rate of addition of the second reactant to form the procaine penicillin also exert some influence over the type of crystals obtained. Thus, there is a slight variation depending on whether a water-soluble procaine salt is added as a dry solid or aqueous solution to the solution of penicillin salt containing the gum. The rate of addition of this second reactant also will control to a minor extent the nature of the crystals formed. Agitation used during crystallization will also have a slight influence on the crystal type.

In general in carrying out the preparation of our gum-treated procaine penicillin we utilize a solution of an alkali metal salt of penicillin, particularly aqueous solutions of the sodium or potassium salts having a concentration of from about 10 to about 70 grams per 100 milliliters of water. The crystalline compounds may be used or cruder materials, such as concentrates obtained in the penicillin manufacturing process, are suitable. The chosen gum is preferably employed at a concentration of from about 0.1 to about 5 percent based on the total volume of solution after mixing the two reactants. The proportion of gum in this solution will control the amount that is found modifying the procaine penicillin particles. For instance, when procaine penicillin was crystallized in the presence of a solution containing 1.0 percent of pectin, the crystals that were isolated were found to contain 3.5 percent by weight of the gum. When a solution having a concentration of 0.5 percent of pectin was used and conditions were otherwise the same, the isolated procaine penicillin crystals contained 1.5 percent of the gum. In general, we prefer to produce crystals modified by at least about 0.5 percent and up to about 5.0 percent by weight of gum.

The water-soluble procaine salt used in preparing our new type of procaine penicillin crystals may be any water-soluble salt of procaine whose acidic component does not form an insoluble salt with the metallic ion of the penicillin salt used as starting material. We find that procaine hydrochloride is particularly suitable, since it has very high solubility in water. Concentrated aqueous solutions may be prepared and are quite convenient for this reaction.

Some vegetable gums disperse slowly in water. If desired, they may be heated to speed the process. After cooling, the penicillin salt may be added and, if necessary, the solution may be filtered to remove any undissolved material. After precipitation of the procaine penicillin crystals, they may be rinsed with water or with a solvent such as acetone to assist in drying. Excessive washing, particularly with water, should be avoided since part of the gum may be removed from the crystals.

The invention may be more readily understood by a consideration of the following illustrative examples.

EXAMPLE I

One gram of pectin was dissolved in 50 ml. of distilled water. To the clear solution were added 30 grams of crystalline potassium penicillin. A second solution was prepared containing 27.2 grams of procaine hydrochloride in 50 ml. of distilled water. The solution of the penicillin salt was placed in a beaker with a glass stirrer and mechanically agitated while the procaine hydrochloride was added. Crystals of procaine penicillin soon separated. After stirring for 15 minutes the product was filtered, washed with a small volume of water and dried.

The crystals produced by this method were examined under the microscope. They were found to be compact, dense, and uniform in size and shape, and to contain practically no fine or irregular material. In contrast to this, a sample of procaine penicillin prepared in exactly the same manner, but with the omission of the pectin regulator, was found by microscopic examination to contain flat, blade-like or plate-like crystals and a high proportion of fragments, very irregular in size and shape. This material seemed much more fragile and easily broken on mechanical handling, and many particles were considerably smaller in size than those of the pectin-modified salt.

A sterile sesame oil suspension of the pectinized procaine penicillin prepared by the above method (30,000 units/kg.) was injected intramuscularly in each of four rabbits. Blood samples were drawn from the animals at 18 hours and at 24 hours after injection. The penicillin level in the blood samples was determined by a microbiological method. The following is a tabulation of the results obtained with this preparation:

| Animal | Blood Levels | |
|---|---|---|
| | 18 Hours | 24 Hours |
| | unit/ml. | unit/ml. |
| Rabbit No. 1 | 0.20 | 0.20 |
| Rabbit No. 2 | 0.26 | 0.20 |
| Rabbit No. 3 | >0.40 | >0.40 |
| Rabbit No. 4 | 0.14 | 0.10 |

From our experience with this test method and by correlation of the results obtained in human patients, we found from these blood levels that the injection of 300,000 units of this new product intramuscularly in human patients will achieve a therapeutic level of penicillin in the blood (at least 0.03 unit/ml.) of 100 percent of the patients for 24 hours or more. Crystalline procaine penicillin prepared by the ordinary method without the use of the vegetable gum does not give this high and uniform blood level.

EXAMPLE II

The above experiment was repeated using exactly the same proportions, but only 0.50 gram of pectin was used. As above, the crystals of procaine penicillin obtained were very uniform in size and shape, dense and compact. They differed markedly from material prepared without the use of a vegetable gum. This product was also tested for maintenance of high blood level by injecting an oil suspension intramuscularly in four rabbits and again determining blood levels at 18 hours and 24 hours:

| Animal | Blood Levels | |
|---|---|---|
| | 18 Hours | 24 Hours |
| | unit/ml. | unit/ml. |
| Rabbit No. 1 | >0.40 | 0.20 |
| Rabbit No. 2 | >0.40 | >0.40 |
| Rabbit No. 3 | >0.40 | >0.40 |
| Rabbit No. 4 | 0.26 | 0.16 |

These experiments were repeated using agar, gum tragacanth, and acacia. In each case when the gum was used to regulate crystallization, the size, shape, density and hardness of the crystals were favorably controlled as in the examples above. Details of these preparations are given in the following examples.

EXAMPLE III

Formula:                                           Gm.
  Procaine hydrochloride _____ 13.6
  Crystalline potassium penicillin G _____ 15.0
  Agar _____ 0.4

*Method of preparation*

1. Dissolve the procaine hydrochloride in 15 ml. of distilled water.
2. Dissolve the agar in 25 ml. of distilled water, and when completely in solution, add the penicillin.
3. When the penicillin is completely in solution, add the procaine hydrochloride solution all at once. Then mix completely, allow to stand 3 minutes. Crystals of procaine penicillin are formed, associated with and containing the agar.

4. Filter immediately, washing with 20 ml. distilled water. Dry under vacuum.

EXAMPLE IV

Formula:

| | Gm. |
|---|---|
| Procaine hydrochloride | 13.6 |
| Crystalline potassium penicillin G | 15.0 |
| Tragacanth U. S. P. | 0.4 |

*Method of preparation*

1. Dissolve the procaine hydrochloride in 15 ml. of distilled water.
2. Dissolve the tragacanth in 25 ml. of distilled water, and when completely in solution, add the penicillin.
3. When the penicillin is completely in solution, add the procaine hydrochloride solution to the tragacanth-penicillin solution all at once. Then mix completely. Allow to stand 3 minutes.
4. Filter immediately, washing with 20 ml. distilled water. Dry under vacuum.

EXAMPLE V

Formula:

| | Gm. |
|---|---|
| Procaine hydrochloride | 13.6 |
| Crystalline potassium penicillin G | 15.0 |
| Acacia U. S. P. | 0.4 |

*Method of preparation*

1. Dissolve the procaine hydrochloride in 15 ml. of distilled water.
2. Dissolve the acacia in 25 ml. of distilled water, and when completely in solution, add the penicillin.
3. When the penicillin is completely in solution, add the procaine hydrochloride solution to the acacia-penicillin solution all at once. Then mix completely. Allow to stand 3 minutes.
4. Filter immediately, washing with 20 ml. distilled water. Dry under vacuum.

EXAMPLE VI

Formula:

| | Gm. |
|---|---|
| Procaine hydrochloride | 13.6 |
| Crystalline potassium penicillin G | 15.0 |
| Pectin | 0.4 |

*Method of preparation*

1. Dissolve the procaine hydrochloride in 15 ml. of distilled water.
2. Dissolve the pectin in 25 ml. of distilled water, and when completely in solution, add the penicillin.
3. When the penicillin is completely in solution, add the procaine hydrochloride solution to the pectin solution all at once. Mix completely and allow to stand 3 minutes. Crystals of modified procaine penicillin are formed.
4. Filter immediately, washing with 20 ml. of distilled water and dry under high vacuum.

Other vegetable gums or mixtures thereof may be employed in the above examples. We have found that high quality citrus pectin of 200-250 grade is particularly satisfactory for these preparations. Other quality pectin may be used, but any deleterious impurities should be removed before it is used.

It has also been established that the procaine penicillins formed in the presence of vegetable gums give blood levels that are definitely superior to those obtained with the untreated drug. A number of such products have been made and blood levels have been determined after intramuscular injection of suspensions thereof in experimental animals. We know from our experience with this conventional testing method and from the results obtained with these gum-modified procaine penicillins that the intramuscular injection of 300,000 units of one of these preparations in man will be sufficient to assure a therapeutic level of the antibiotic in the blood stream for 24 hours or more in substantially every case. The gum-treated crystals may be suspended in water or in a pure vegetable oil, such as cottonseed oil, peanut oil, or sessame oil, in such a concentration as to provide the necessary therapeutic dosage. For parenteral administration, suspensions of about one-half to 5 milliliters of 100,000 to 600,000 units/ml. may be used. When an aqueous suspension is employed, it is advisable to prepare the suspension shortly before it is used.

As many apparently widely different embodiments of this invention may be made without departing from the spirit and scope hereof, it is to be understood that this invention is not limited, except as defined in the appended claims.

We claim:

1. The process for preparing procaine penicillin crystals in modified form, which comprises reacting a water-soluble procaine salt with a water-soluble salt of penicillin in an aqueous solution containing a small amount of a vegetable gum selected from the class consisting of water-soluble carboxymethyl cellulose, pectin, acacia, gum tragacanth and agar.

2. The process for preparing procaine penicillin crystals in modified form, which comprises reacting procaine hydrochloride with a water-soluble salt of penicillin in an aqueous solution containing a small amount of gum tragacanth.

3. Therapeutic preparation comprising uniform crystals of procaine penicillin containing substantially between 0.5% and 5.0% by weight of a co-precipitated vegetable gum selected from the class consisting of water-soluble carboxymethyl cellulose, pectin, acacia, gum tragacanth and agar.

4. The preparations of claim 3, wherein the vegetable gum is pectin.

5. The preparations of claim 3, wherein the vegetable gum is gum tragacanth.

6. The process for preparing procaine penicillin crystals in modified form which comprises reacting procaine hydrochloride with a water soluble salt of penicillin in an aqueous solution containing a small amount of carboxymethyl cellulose.

7. The process for preparing procaine penicillin crystals in modified form which comprises reacting procaine hydrochloride with a water soluble salt of penicillin in an aqueous solution containing a small amount of pectin.

References Cited in the file of this patent

UNITED STATES PATENTS

| 2,515,898 | Rhodehamel | July 18, 1950 |
| 2,544,272 | Miller | Mar. 6, 1951 |

FOREIGN PATENTS

| 515,566 | Great Britain | Dec. 8, 1939 |

OTHER REFERENCES

Salivar: "J. Am. Chem. Soc.," vol. 70 (1948), pp. 1287-1288.

Sullivan et al.: "Science," vol. 107, Feb. 13, 1948, pp. 169-170.

Boger et al.: "Am. J. Med. Sci.," vol. 212, Mar. 1948, pp. 250-256.

Proc. Staff Meet. Mayo Clinic, Dec. 10, 1947, pp. 567-570.